United States Patent Office 3,014,871
Patented Dec. 26, 1961

3,014,871
NEW COMPOUNDS AND LUBRICANT COMPOSITIONS CONTAINING SAME
James M. Fulton, Verona, Pa., and William E. Brown, Dallas, Tex., assignors to Gulf Research & Development Company, Pittsburgh, Pa., a corporation of Delaware
No Drawing. Filed Sept. 17, 1956, Ser. No. 610,417
10 Claims. (Cl. 252—49.7)

This invention relates to new compounds and to new compositions of matter containing the same such as lubricants, particularly greases.

The new compounds of this invention can be defined as compounds whose anionic portion comprises a polymeric anion having a base exchange capacity of at least about 5 milliequivalents per 100 grams and whose cationic portion comprises an onium precursor substituted onium cation.

In preparing the new compounds any polymeric compound having a cationic base exchange capacity of at least about 5 and preferably about 20 to about 1000 milliequivalents per 100 grams of polymeric compound can be used. By "polymeric compound" we mean to include any compound having a repeating structural unit such as the

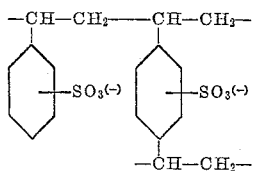

unit in sulfonated polystyrene cross-linked with divinyl benzene,

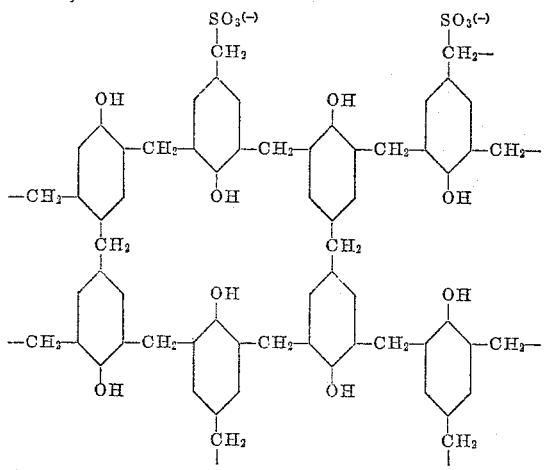

unit in a sulfonated phenol-formaldehyde resin,

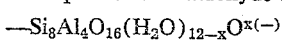

where $x$ is a number between one and 12, as in montmorillonite, $Si_4Al_4O_{10}(OH)_{8-x}O_x{}^{x(-)}$, where $x$ is a number between one and 8, as in kaolinite or halloysite, etc. Included among the anions which can constitute the anionic portion of the new compounds of our invention are the alumino-silicate ions, natural and synthetic, such as montmorillonite and Permutit, Decalso and Zeo Dur (Permutit Company), and organic resinous anionic matrices such as phenolic methylene sulfonic acid types which go under such trade names as Amberlite IR–100, Amberlite IR–105 (Rohm and Haas Company, Dowex 30 (Nalcite MX) (Dow Chemical Company), Duolite C–3 (Chemical Process Company), Ionac C–200 (American Cyanamid Company), Wofatit P, Wofatit K, Wofatit KS (I. G. Farben Industrie—A.G.), Zeo Rex (Permutit Company); sulfonated coal types, such as Zeo Karb (Permutit Company); nuclear sulfonic types such as Amberlite IR–120 (Rohm and Haas Company) and Dowex 50 (Nalcite HCR) (Dow Chemical Company); carboxylic acid types such as Alkalex (Research Products Corporation), Amberlite IRC–50 (Rohm and Haas Company), Duolite CS–100 (Chemical Process Company), Permutit 216 (Permutit Company), and Wofatit (I. G. Farben Industrie—A.G.). Of these the alumino-silicate ions are preferred.

Among the alumino-silicates which can be employed in preparing the above compounds can be mentioned clay minerals of the montmorillonite group, such as montmorillonite, saponite, nontronite, hectorite, and sauconite; the kaolin group such as kaolinite, nacrite, dickite, and halloysite; the hydrous mica group such as hydrobiotite, glauconite, illite, and bramallite; the chlorite group such as chlorite and chamosite; clay minerals not belonging to the above groups such as vermiculite, attapulgite, and sepiolite; and mixed-layer varieties of the above minerals and groups.

The clay minerals defined above occur as minute, plate-like, tube-like and/or fiber-like particles having an extremely large surface area compared to that of an equivalent quantity of a granular material such as sand. This combination of small size and great surface area results in a high surface energy with attendant unusual surface properties and extreme affinity for surface-active agents. The structure of some of these clays, as for instance montmorillonite, can be pictured as a stack of sheet-like three-layer lattice units which are weakly bonded to each other and which are expanded in the "$c$" crystallographic direction by water or other substances which can penetrate between the sheets and separate them.

All clay minerals have ion-exchange properties. Thus, for example, montmorillonite has a cation-exchange cappacity of from 90 to 130 milliequivalents per 100 grams of clay, illite from about 20 to 40 milliequivalents and kaolinite from about 5 to 15 milliequivalents. The properties of the clays vary widely with the cations occupying the base exchange positions or sites. A "base-exchange position or site" can be defined as an area, in this instance on a clay crystal, which has associated with it an exchangeable cation. Among the cations which are generally found on the base-exchange position or site can be mentioned sodium, potassium, calcium, manganese, iron, hydrogen, etc. The ions are believed to be held to the clay surface by ionic forces. Of the alumino silicates which are particularly effective in obtaining the new compounds of this invention are montmorillonite and illite.

In preparing the compounds of this invention an acid or a salt of the polymeric anion defined above, preferably an acid or a salt of an alumino-silicate, is preferably reacted with an onium precursor substituted onium compound by the substitution for the polymeric compound cation of the cation of the onium precursor substituted onium compound. Another method for preparing the new compounds involves mixing with the acids of the mentioned polymeric anion the onium precursor of the onium-precursor substituted onium compound.

By "onium ion" we mean to include such ions as defined in Hackh's Chemical Dictionary, third edition, page 594: "A group of organic compounds [ions] of the type $RXH_y$, which are isologs of ammonium and contain the element X in its highest positive valence, as X is pentavalent:

Ammonium, —$NH_4$
Phosphonium, $R.PH_4$
Arsonium, $R.AsH_4$
Stibonium, $R.SbH_4$ X is tetravalent:
> Oxonium, R.OH$_3$
> Sulfonium, R.SH$_3$
> Selenonium, R.SeH$_3$
> Stannonium, R.SnH$_3$ X is trivalent:
> Iodonium, R.IH$_2$ They may also be considered as addition compounds [ions] cf. oxonium, carbonium, stibonium, -inium, -ylium." By "onium compound" we mean to include the combination of an onium ion with a cation such as chloride, bromide, sulfate, etc. By "onium precursor" we mean a compound from which an onium ion would be formed by the addition thereto of at least one proton, as for example from ammonia would be formed ammonium by the addition of a proton.

Any onium precursor substituted onium compound can be reacted with the defined polymeric compound to form the desired new compounds of this invention. For best results, however, we prefer to employ onium precursor substituted onium compounds having no carbon atoms, as in hydrazino, to as many as 100 carbon atoms in the molecule. While R in the above formulae is preferably an onium precursor substituted alkyl group having about one to about 100 carbon atoms in the molecule, R can be aryl, alkaryl, aralkyl, cycloalkyl, cycloalkaryl, etc. having about one to about 100 carbon atoms. The number of onium precursors, the same or different, which can be present on the onium compound is at least one and is dependent, to an extent, by the length of the onium compound itself. Thus, when the onium compound is of long length, many onium precursors can be accommodated. In general, the number of onium precursors substituted on the onium compound can be as much as fifty or more. Among the compounds which can be employed to form the anionic portion of the new compounds of this invention are 2-amino-ethylammonium montmorillonite, 2-aminoethylammonium Amberlite IR-100, sodium calcium 2-aminoethylammonium montmorillonite, sodium calcium 2-aminoethylammonium Zeo Dur, 2-aminoethylammonium dodecylammonium bentonite, 2-aminoethylammonium dodecylammonium Dowex 30, 3-amino-n-butylphosphonium illite, 3-amino-n-butylphosphonium Duolite C-3, arsinomethylethylenediarsonium montmorillonite arsinomethylethylenediarsonium Wofatit P, 3-(aminoethoxy) propylstibonium zeolite, 3-(aminoethoxy) propylstibonium Alkatex, 5-stibino-n-amylstibonium saponite, 5-stibino-n-amylstibonium Amberlite IRC-50, ethylenediammonium chloride montmorillonite, ethylenediammonium chloride Duolite CS-100, 5-stibino-3-keto-n-amylstibonium montmorillonite, 5-stibino-3-keto-n-amylstibonium Wofatit K, 1-methoxy-2-amino-3-thia-4-chlorohexylammonium saponite, 1,4-diethylene diamine monosaponite, 3-aminoanilinium bentonite, 3-arsino-5-stibinophenyl phosphonium bentonite, 2-aminopyrrolinium zeolite, 2-aminoethylammonium 6-amino-2-ethoxy-10-methylacridinium nontronite, orthopyrroloammonium zeolite, 3-amino-1-naphthalenediazonium zeolite, (2-aminovinyl) isopropyloxonium bentonite, 2,4,6-triarsinopyrylium montmorillonite (2-stibinovinyl) isopropylselenonium saponite, (2-aminovinyl) isopropylteluronium saponite and 3-ethylamino-7-dimethylaminophenazathionium spent cracking catalyst.

While any convenient method for preparing the new compounds of this invention can be employed, we prefer to prepare the same by reacting a fractional salt of the onium precursor substituted onium compound with the defined polymeric compound. By "fractional salt" we mean a compound in which the functional onium portion is neutralized but at least one of the onium precursor substituents remains free. For example, ethylene diamine can be reacted with hydrochloric acid (or other fairly low molecular weight acid, such as sulfuric acid or acetic acid) in a 2 to one mol ratio to obtain ethylene diamine monohydrochloride. The monohydrochloride can then be reacted in aqueous solution wtih montmorillonite to give aminoethylammonium montmorillonite.

The preparation of compounds embraced by the present invention can be illustrated by the following examples.

EXAMPLE I

Crude Wyoming bentonite was dispersed in distilled water at a concentration of 10 to 15 grams per liter and purified by sedimentation for 15 hours. The material remaining in suspension (equivalent spherical diameter less than 2.6$\mu$) was siphoned off and used to prepare the reaction product described below. The monohydrochloride salt of "Duomeen-T" (Armour Chemical Company, R—NH—CH$_2$—CH$_2$—CH$_2$—NH$_2$, where R is a mixture of straight chain hydrocarbons of average molecular weight of 247 derived from tallow) was prepared by adding sufficient hydrochloric acid to reach the first equivalence point of the titration (pH=3.5) which corresponds to neutralization of the secondary nitrogen. Gravimetric analysis of the clay suspension showed that the clay content was 13.8 grams per liter. A two-fold excess of "Duomeen T" monohydrochloride (on the basis of one gram of clay equals one milliequivalent base exchange capacity) was added to 21 liters of clay suspension. After mixing thoroughly on a shaker, the resultant curdy precipitate was allowed to stand in contact with the supernatant solution for three days to ensure complete reaction. The precipitate was filtered off and washed with distilled water until a clear filtrate with a negative chloride test (AgNO$_3$) was obtained. This material was dried to produce friable, off-white granules which were used to make a grease.

EXAMPLE II

A two-fold of hydrazino chloride is added to the clay suspension of Example I. After mixing thoroughly on a shaker, the resultant precipitate is allowed to stand in contact with the supernatant solution for three days to ensure complete reaction. The precipitate is filtered off and washed with distilled water until a clear filtrate with a negative chloride test (AgNO$_3$) is obtained, after which the material is dried for subsequent use.

EXAMPLE III

A ten-fold excess of a 10 percent aqueous solution of 2-aminopyridinium bromide is recirculated, at a rate of 5 gallons per square foot per minute, ten times through one kilogram of a dry nuclear sulfonic cationic exchange resin manufactured by Dow Chemical Company and having the trade name "Dowex-50." Bauman, Skidmore and Osmun (Industrial and Engineering Chemistry 40, page 1350 (1948), define "Dowex-50" as a "cationic exchange resin . . . with a crosslinked aromatic hydrocarbon chain containing nuclear sulfonic acid groups as the sole cation active group." At the end of the contact period the recirculating liquid is removed and a solid reaction product is obtained.

It is apparent that the above examples have been presented merely as illustrative of our invention and that we do not intend to be limited thereby. For example, each of the specific polymeric compounds and onium precursor substituted onium compounds defined above can be substituted for their corresponding compound in the examples above and the new compounds of this invention are obtained.

The new compounds of this invention are very effective in the preparation of lubricants, particularly greases, having a high resistance to leaching by water.

In preparing the improved lubricants of this invention we can employ any of the oils of lubricating grade, natural as well as synthetic such as silicone oils, fluorocarbon oils, etc., customarily used in compounding greases. Thus the oil can be a refined or semi-refined paraffinic- or naphthenic-, or asphaltic-base oil having a viscosity of about 50 to 4000 SUS at 100° F. If desired, a blend of oils of suitable viscosity can be employed instead of a single oil, by means of which any desired viscosity within the range of 50 to 4000 SUS at 100° F. can be obtained. The viscosity of the oil has little effect on the dropping point of the compositions but more viscous oils produce compositions having greater stickiness and adhesive properties than do the lighter oils. The oil content of the compositions prepared according to this invention can comprise about 70 to about 95 percent or more by weight of the total composition. The particular oil as well as the exact amount of oil employed depends upon the characteristics desired in the final composition.

The amount of the new compound of this invention used to prepare the improved lubricants, such as greases, can vary over wide limits depending upon the particular oil with which the new compound is to be blended and upon the properties desired in the final lubricating composition. While as much as 30 percent by weight of the total composition can comprise the new compound, we prefer to use smaller amounts, that is, on the order of about 5 to 15 percent by weight. It should be understood, however, that depending upon the consistency of the composition desired, less than 5 percent or more than 5 percent of the new compound can be employed. When the composition contains less than 5 percent of the new compound very little gelling occurs. Compositions containing less than 5 percent of the new compounds are semi-fluid in nature and have penetrations on the order of 400. Compositions containing more than about 30 percent by weight of the new compounds are very stiff. The consistency-temperature relation of compositions containing as much as 30 percent of the new compounds indicates that these compositions would be suitable for use where block greases are desired such as in open journal bearings of paper mill driers and the trunnion bearings of rotary kilns. It is understood of course that when we speak of one of our new compounds being employed in admixture with the mineral oil ingredient, one or more of such compounds can be used.

In preparing the new lubricants of this invention, we can employ one or more solvating agents to facilitate dispersion of the new compound in the oil. Suitable solvating agents are polar organic compounds such as organic acids, esters, alcohols, ethers, ketones, and aldehydes, especially low molecular weight compounds of these classes. Examples of suitable solvating agents are: ethyl acetate, acetic acid, acetone, methyl alcohol, ethyl alcohol, benzoyl chloride, butyl stearate, coconut oil, cyclohexanone, ethylene dichloride, ethyl ether, furfural, isoamyl acetate, methyl ethyl ketone and nitrobenzene. In cases where the use of a solvating agent is desirable for effecting more rapid and more comple dispersion of the compound in the oil, ordinarly only a relatively small amount of such agent may be necessary. However, as much as about 50 percent by weight based on the amount of new compound can be used. In addition the new compounds of this invention can be incorporated in petroleum oils by carrying out their synthesis in the oils.

Example IV below shows the preparation of an improved grease in accordance with the present invention.

EXAMPLE IV 85.7 percent by weight of a 500/3 Texas Oil and 14.3 percent by weight of the compound produced in Example I, montmorillonite-Duomeen-T-monohydrochloride complex, were mixed at room temperature and then heated and stirred at a temperature of 230° to 240° F. for approximately one-half hour. This was followed by milling and rolling for one hour at 80 r.p.m. The grease prepared had a penetration, ASTM D–217–52T, unworked of 258 and worked of 313 and exhibited excellent adhesion to metal. The grease was subjected to a BEC Test to determine the amount of grease retained in bearings at various temperatures. This test involves placing 1½ grams of grease in a ballbearing and thereafter revolving the bearing at 1800 r.p.m. for 30 minutes at selected temperatures. At the end of 30 minutes the amount of grease leaking from the bearing is weighed and the grease retention determined. The results were as follows:

| Temperature, °F. | Grease Retained in Bearings, Percent by Weight |
|---|---|
| 85 | 99.4 |
| 150 | 99.4 |
| 220 | 98.0 |
| 260 | 98.7 |

In order to show the remarkable resistance to water leaching of the improved greases of this invention, another grease was prepared exactly in accordance with the grease prepared in Example IV except that 14.3 percent by weight of montmorillonite - Duomeen - T - dihidrochloride was used in place of montmorillonite-Duomeen-T-monohydrochloride. In other words, one had no free amine groups present while the compound of Example IV had one free amine group on the chain. The greases were placed on a rotating rack and were sprayed with 500 milliliters of water per minute for 15 minutes at various temperatures. The results are set forth below in Table I. Column 1 represents the percent by weight of grease retained in the grease of Example IV, while column 2 represents the percent by weight of grease retained using the grease prepared with montmorillonite-Duomeen-T-dihydrochloride.

Table I

| Temperature, °F. | 1 | 2 |
|---|---|---|
| 80 | 84 | 56 |
| 100 | 71 | 23 |
| 120 | 49 | 5 |
| 140 | 18 | 0.0 |
| 160 | 6 | |
| 180 | 0.0 | |

It can be seen from Table I that the greases prepared in accordance with our invention have increased resistance to leaching by water. At 80° F., 84 percent by weight of the grease was retained, whereas at the same temperature almost half of the grease employing montmorillonite-Duomeen-T-dihydrochloride was lost. In fact, at 140° F. while none of the latter grease was retained, 18 percent, enough to give some lubricating protection, of the improved grease was retained. Only when the temperature was raised to the extremely high temperature of 180° F. was all of the improved grease leached as a result of action by water. While we do not wish to be bound thereby, we believe the unusual resistance to water leaching of the improved grease is due to the presence of the free amine group in the montmorillonite-Duomeen-T-monohydrdrochloride used.

If desired, compounds employed for a particular purpose, such as an antioxidant, can be added to the lubricant prepared herein. Thus, in instances where the lubricant compositions of this invention are to be subjected to prolonged use under oxidizing conditions, we can advantageously incorporate therein a small amount of a diaryl amine oxidation inhibitor. As examples of some of the diaryl amines which can be used in the preparation of the lubricants can be mentioned diphenylamine, phenyl alpha naphthylamine, alpha alpha, alpha beta-, and beta beta-dinaphthylamines and the like. The amount of the diaryl amine employed will depend to a large extent upon the severity of the conditions to which the grease is subjected, as well as the particular diaryl amine used. Generally, however, the amount of diaryl amine employed is between about 0.1 and about 1.5 percent by weight based upon the weight of the final lubricant composition. In addition, the improved greases of this invention can be used in combination with conventional greases, such as sodium, lithium, silica, aluminum, calcium, strontium, barium, etc. base greases, to impart water stability thereto.

Our new compounds have uses in addition to their use as an ingredient in the preparation of the improved lubricants defined herein. Used in relatively small amounts in lubricants, the new compounds can be used to inhibit corrosion of a metal surface in contact with the lubricant. Added to waxes, the new compounds can improve the coefficient of friction of the surface of the wax and increase the tensile and sealing strength thereof. The new compounds would have valuable anti-stripping effects in asphalts used in making aggregates and would raise the melting points of asphaltic compositions or pitch compositions in which they might be incorporated. Added to gasolines, the alumino-silicates, decomposed by combustion in the cylinders, would provide valuable abrasives for scouring the cylinder walls and keeping them free of harmful carbon deposits.

Obviously, many modifications and variations of the invention, as hereinabove set forth, can be made without departing from the spirit and scope thereof and, therefore, only such limitations should be imposed as are indicated in the appended claims.

We claim:

1. A compound whose anionic portion comprises an alumino-silicate having a base exchange capacity of at least about 5 milliequivalents per 100 grams and whose cationic portion comprises a substituted ammonium cation carrying two hydrocarbon radicals, at least one of said radicals carrying a free amine group.

2. A compound whose anionic portion comprises an alumino-silicate of the montmorillonite group having a base exchange capacity of at least about 5 milliequivalents per 100 grams and whose cationic portion comprises a substituted ammonium cation carrying two hydrocarbon radicals, at least one of said radicals carrying a free amine group.

3. A compound whose anionic portion comprises an alumino-silicate of the kaoline group having a base exchange capacity of at least about 5 milliequivalents per 100 grams and whose cationic portion comprises a substituted ammonium cation carrying two hydrocarbon radicals, at least one of said radicals carrying a free amine group.

4. A compound whose anionic portion comprises an alumino-silicate of the hydrous mica group having a base base exchange capacity of at least about 5 milliequivalents per 100 grams and whose cationic portion comprises a substituted ammonium cation carrying two hydrocarbon radicals, at least one of said radicals carrying a free amine group.

5. A compound whose anionic portion comprises an alumino-silicate of the chlorite group having a base exchange capacity of at least about 5 milliequivalents per 100 grams and whose cationic portion comprises a substituted ammonium cation carrying two hydrocarbon radicals, at least one of said radicals carrying a free amine group.

6. A lubricant comprising a lubricating oil having dispersed therein the compound of claim 1 in an amount sufficient to thicken said oil to the consistency of a grease.

7. A lubricant comprising a lubricating oil having dispersed therein the compound of claim 2 in an amount sufficient to thicken said oil to the consistency of a grease.

8. A lubricant comprising a lubricating oil having dispersed therein the compound of claim 3 in an amount sufficient to thicken said oil to the consistency of a grease.

9. A lubricant comprising a lubricating oil having dispersed therein the compound of claim 4 in an amount sufficient to thicken said oil to the consistency of a grease.

10. A lubricant comprising a lubricating oil having dispersed therein the compound of claim 5 in an amount sufficient to thicken said oil to the consistency of a grease.

References Cited in the file of this patent

UNITED STATES PATENTS

| | | |
|---|---|---|
| 2,283,236 | Soday | May 19, 1942 |
| 2,421,082 | Pier | May 27, 1947 |
| 2,425,747 | Lieber | Aug. 19, 1947 |
| 2,569,400 | Butler | Sept. 25, 1951 |
| 2,668,145 | Ronay | Feb. 2, 1954 |
| 2,767,177 | Erickson | Oct. 16, 1956 |
| 2,767,189 | Erickson | Oct. 16, 1956 |

UNITED STATES PATENT OFFICE
CERTIFICATE OF CORRECTION

Patent No. 3,014,871            December 26, 1961

James M. Fulton et al.

It is hereby certified that error appears in the above numbered patent requiring correction and that the said Letters Patent should read as corrected below.

Column 1, line 56, the formula should appear as shown below instead of as in the patent:

$$-Si_8Al_4O_{16}(H_2O)(OH)_{12-x}O^{x(-)}$$

column 4, line 36, after "two-fold" insert -- excess --; column 5, line 53, for "comple" read -- complete --.

Signed and sealed this 8th day of May 1962.

(SEAL)
Attest:

ERNEST W. SWIDER
Attesting Officer

DAVID L. LADD
Commissioner of Patents